United States Patent [19]

Schmidtke et al.

[11] 3,840,986

[45] Oct. 15, 1974

[54] METHOD OF PRODUCING MICRO-ELECTRONIC CIRCUITS

[75] Inventors: Martin Schmidtke; Winfried Ruettenauer, both of Munich; Reinhold Penzl, Eichenau, all of Germany

[73] Assignee: Siemens Aktiengesellschaft, Berlin and Munich, Germany

[22] Filed: Aug. 31, 1972

[21] Appl. No.: 285,552

[30] Foreign Application Priority Data

Sept. 23, 1971 Germany .......... 2147573

[52] U.S. Cl. .......... 29/625, 29/624, 117/207.1, 117/212, 118/48, 118/53

[51] Int. Cl. .......... C23c 13/00

[58] Field of Search .......... 117/107, 107.1, 119, 212; 118/48–49.5, 52, 53, 500; 29/625

[56] References Cited

UNITED STATES PATENTS

| | | | |
|---|---|---|---|
| 2,872,391 | 2/1959 | Hauser et al. | 117/119 X |
| 3,128,205 | 4/1964 | Illsley | 117/107.1 X |
| 3,583,363 | 6/1971 | Shrader | 118/500 |
| 3,598,083 | 8/1971 | Dort et al. | 118/53 |
| 3,643,625 | 2/1972 | Mahl | 118/48 |
| 3,656,453 | 4/1972 | Tousimis | 118/53 |
| 3,668,028 | 6/1972 | Short | 156/3 |

OTHER PUBLICATIONS

Kremen, "Laser Hole Making in Printed Circuit Boards," IBM Technical Disclosuer Bulletin, August 1965.

*Primary Examiner*—C. W. Lanham
*Assistant Examiner*—Joseph A. Walkowski
*Attorney, Agent, or Firm*—Hill, Gross, Simpson, Van Santen, Steadman, Chiara & Simpson

[57] ABSTRACT

A substrate for a micro-electronic circuit is pierced at select locations thereof, as by a laser beam or an ultrasonic drill and then mounted for rotation about a pair of axes defining an angle therebetween within a vacuum metal vaporization apparatus. A metal, such as gold, is vaporized within the apparatus and is uniformly deposited on the through-hole walls. Galvanic reinforcement of the metal coating on the through-hole walls takes place simultaneously with deposition of select circuit paths.

3 Claims, 8 Drawing Figures

METHOD OF PRODUCING MICRO-ELECTRONIC CIRCUITS

BACKGROUND OF THE INVENTION

1. Field of the Invention

The invention relates to methods of producing micro-electronic circuits and more particularly to a method of producing micro-electronic circuits that includes metallizing through-hole walls.

2. Prior Art

It is known to produce multi-layer printed circuits having individual circuit portions electrically connected through an insulating substrate. Through-holes are produced at select locations of a substrate and the through-hole walls are metallized initially by a current-free metal deposition (i.e., a chemical deposition) and then reinforced by a galvanic process. Such prior art method of producing through-contacts is not of general utility because of the limited adhesion of chemically deposited metals. Further, the metals that are susceptible to current-free metal depositions are very limited.

SUMMARY OF THE INVENTION

The invention provides a novel method of producing micro-electronic circuits on a substrate whereby through-contacts are produced that provide good electrical connection with an extremely wide variety of substrate materials and conductor materials.

It is a novel feature of the invention to metallize through-hole walls of a substrate by controllably moving the substrate through a metallizing atmosphere so that metal is uniformly deposited on all areas of the hole walls.

It is another novel feature of the invention to rotate a substrate having through-holes therein through a metallizing atmosphere, such as obtained during vacuum vaporization of a metal, so as to uniformly metallize all areas of the hole walls.

It is yet another novel feature of the invention to simultaneously rotate a substrate having through-holes therein about two different axes that define an angle therebetween, through a metallizing atmosphere so as to uniformly metallize all areas of the hole walls. In preferred embodiments, one axis of rotation is parallel with the normal of the substrate and the other axis of rotation forms an acute angle with the first axis of rotation.

DESCRIPTION OF THE PREFERRED EMBODIMENTS

Figure 1:
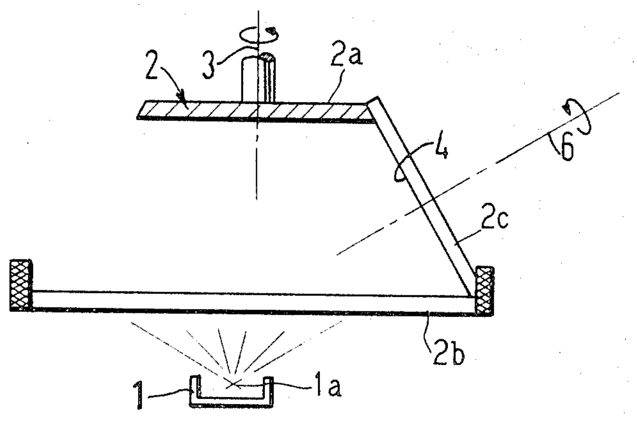
FIG. 1 is an elevated schematic view of an exemplary embodiment of a vacuum metal vaporization device useful in the practice of the invention.

The invention provides a method of producing micro-electronic circuits with a large variety of substrate materials and conductor materials that include uniformly metallized through-hole walls. In accordance with the principles of the invention, through-hole walls of a substrate are metallized by vacuum vaporization of a conductor material while the substrate is being controllably moved within the conductor material atmosphere so that a substantially uniform coating of the conductor material is deposited on the hole walls.

The invention allows a micro-electronic circuit substrate to be composed of a large number of materials. Generally, all substrate materials on which vapor deposited layers of a conductor material will adhere are suitable. Vapor deposited layers usually exhibit better adhesion strength than chemically or current-freely deposited layers.

The invention also allows a wide selection of conductor materials since a large number of metals, alloys, etc. are readily vaporizable. Accordingly, the electrical characteristics of the metalized coating can more fully govern the selection of a conductor material.

The substrate thickness and the through-hole dimensions are variable over wide limits so that hole geometry required for a select micro-electronic circuit is readily achieved.

The through-holes are produced on a substrate in various ways. For example, through-holes may be produced with an ultrasonic means, a laser means, or an electron beam means. The above-mentioned energy piercing means are especially useful with heat-cured glass or ceramic substrates. Further, the through-hole walls may be produced in a substrate that is in a green or uncured state. In such embodiments, the diameter of the through-hole is adapted to the thickness of the substrate in such a way that good metalization is attained.

In its more simple embodiments, the invention comprises controllably moving a substrate with through-holes therein through a metalizing atmosphere. Preferred forms of motion are rotational motion. In other embodiments, the pierced substrate is simultaneously rotated about two different axes of rotation that define an angle therebetween. Preferred forms of such embodiments comprise rotating one or more pierced substrates about a first axis of rotation that is parallel with the normal of the substrate and about a second axis of rotation aligned to define an acute angle about the first axis of rotation. In certain embodiments, the second axis of rotation is perpendicular to the source of vaporized conductor material. The simultaneous movement of a pierced substrate about two different axes of rotation cause the through-hole walls to successively present portions thereof to the vapor source at changing angles. This produces a uniform or substantially uniform metal coating on the through-hole walls.

In order to produce a very low resistance through-contact, the initially metallized through-hole walls are galvanically metallized after the vapor deposition process. Such galvanic metallization of through-hole walls is preferably conducted simultaneously with the galvanic construction of conductor structures or paths on both sides of a substrate. Prior to such galvanic metallization, it is advantageous to print or otherwise apply a pattern of a photo-lacquer (i.e., a photo resist) on both sides of the substrate which leaves only the conductor pattern and through-holes exposed. Metal can then be galvanically deposited on the exposed areas of the substrate while utilizing the photo-lacquer coating as a galvanic mask. After the desired conductor paths have been produced and the through-hole walls reinforced, the photo-lacquer coating is removed by a suitable etch.

FIG. 1 schematically illustrates an exemplary form of a means for producing a metallizing atmosphere, such as a metal vaporization apparatus that includes a container 1 for a conductor material vapor source 1*a* and a support means mounted for rotation about an axis 3, which is aligned perpendicular with the vapor source 1*a*. Of course, such metal vaporization apparatus includes a housing for encompassing the shown structure, which can be evacuated as well as appropriate heat means, etc. Such structures are conventional and are accordingly not illustrated herein.

Support means 2 is shown as a truncated body with the larger base area 2*b* open toward the vapor source 1*a*. A substrate mounting plate 4 is attached to an angled wall 2*c* of support means 2 and mounted for rotation about an axis 6. Accordingly, each of the substrates 5 mounted on the plate 4 (best seen at FIG. 2) rotate about axis 6 (i.e., parallel with the normal of each substrate) and about axis 3, which is vertical to the plane or orbit of the substrate 5. It will be noted that the axes 3 and 6 are aligned with one another so as to form an acute angle therebetween and that the plane of smaller base 2*a* of means 2 and the plane of plate 4 form an obtuse angle with one another. In other words, one axis of substrate rotation is parallel with the normal of the substrate and the other axis of rotation forms an angle therewith, which is preferably not more than 90°.

Figure 2:
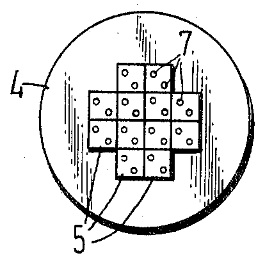
FIG. 2 is a plan view of a mounting device having a plurality of substrates with through-holes ready for metallization.

FIG. 2 illustrates an exemplary form of a substrate mounting plate 4 having a plurality of substrates 5 mounted thereon. Each of the substrates 5 has a plurality of through-holes 7 that are ready for metallization.

Figure 3:
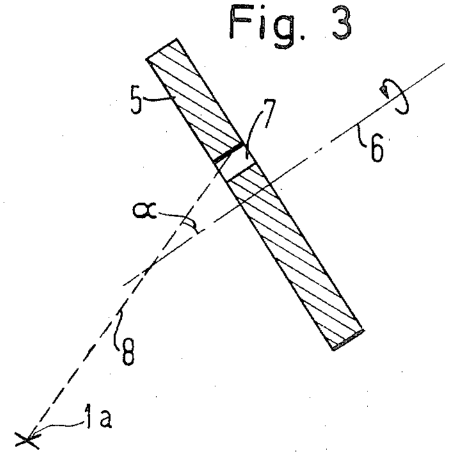
FIG. 3 is an elevated schematic illustration of vapor impingement on a wall of a through-hole in accordance with the principles of the inventions.

As shown at FIG. 3, a metallizing vapor ray 8 from the vapor source 1*a* must impinge on the walls of a through-hole 7 at an angle $\alpha$ which is continuously changing for each surface portion of the hole walls. Accordingly, a uniform metallization of through-hole walls is attained.

The invention is capable of metallizing extremely small diameter through-holes. For example, the arrangement shown at FIG. 1 produces completely metallized through-holes having a diameter of 80 $\mu$m in a ceramic substrate of 250 $\mu$m in thickness.

Figure 4:
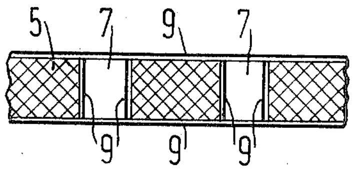
FIGS. 4–8 are sequential diagrammatic views of a substrate undergoing circuit production in accordance with the principles of the invention.
Figure 5:
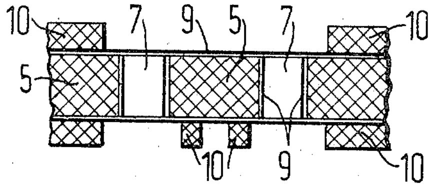
Figure 6:
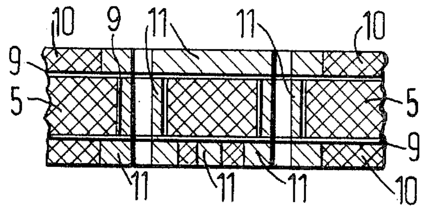
Figure 7:
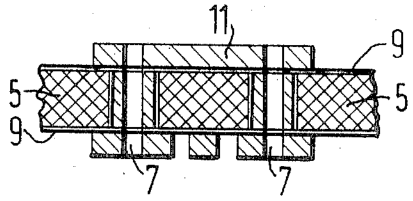
Figure 8:
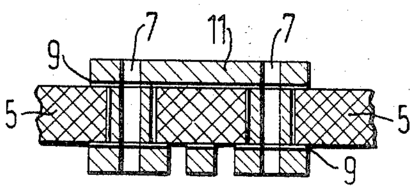

FIGS. 4–8 sequentially illustrate a method of producing micro-electronic circuits, including metalization of through-hole walls thereof in accordance with the principles of the invention. As shown at FIG. 4, a metal layer 9 is deposited on a ceramic substrate 5 having a plurality of through-holes 7. The metal layer 9 coats both sides of the substrate 5 and the walls of the through-holes 7. The metal layer on at least the walls of the through-holes is applied by the earlier described metal vapor deposition process. Then, as shown as FIG. 5, a relatively thick photo-lacquer layer 10 is applied to both sides of the substrate 5 and on top of the metal layer 9 thereon, in a pattern that leaves the desired conductor pattern exposed. Next, the partially processed substrate is subjected to a galvanic process (i.e., an electrodeposition process) and, as shown at FIG. 6, a second metal layer 11 is galvanically deposited on the exposed areas of the substrate and on the metal coated through-hole walls. Then the photo-lacquer layer 10 is removed, as shown at FIG. 7. Finally, as shown at FIG. 8, portions of the metal 9 not coated with the galvanically deposited metal layer 11 are removed by suitable etch and the circuit is completed.

The vapor deposited metal layer 9 is composed, for example, of gold and then reinforced by galvanic deposition of a thicker gold layer 11. Of course, other conductor materials can also be used.

The invention provides a method of producing micro-electronic circuits characterized by a very high packing density on a substrate, such as a ceramic. A ceramic substrate may also function as an insulating plate between the opposing wiring planes and as a mechanical carrier for the wiring.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as is set forth and defined in the hereto-appendent claims.

We claim:

1. A method of substantially simultaneously metallizing exposed surface areas of a main face of a substrate having opposing main faces and wall surfaces of through-holes in said substrate and between said opposing main faces, said wall surfaces of the through-holes being substantially perpendicular to the surfaces of said opposing main faces and said through-holes having a relatively small diameter compatible with micro-electronic circuits; comprising:

mounting said substrate on an inner face of a sidewall of a truncated trapezoidally-shaped hollow body so that select surface areas of a main face of said substrate are exposed, said body having an enlarged open base area and enclosed top and sidewalls, said sidewalls being attached to said top wall so as to define an obtuse angle between said top and sidewalls, said top wall being rotatable about a first axis which is perpendicular to the top wall face and said sidewalls being rotatable about a second axis which is perpendicular to the respective sidewall faces;

positioning an activatable metal vapor source below said open base area of the trapezoidally shaped hollow body so that an up-facing surface of said metal vapor source is parallel to said top wall of said body;

enclosing the space about said trapezoidally shaped hollow body and said metal vapor source;

activating said metal vapor source so as to produce radiating metal vapors within said enclosed space; and rotating said top and sidewalls about their respective axes of rotation whereby the through-hole wall surfaces and exposed surface areas of a main face on the substrate are uniformly exposed to said radiating metal vapors and a substantially uniform layer of metal is deposited on said through-hole wall surfaces and on said exposed surface areas of the main face.

2. A method as defined in claim 1, including galvanically depositing a metal layer on the vapor deposited metal coating on the through-hole walls.

3. A method as defined in claim 2, wherein a photo-lacquer is applied onto select portions of the substrate so as to leave a desired conductor pattern and the metalized through-holes exposed prior to said galvanic deposition and then subjecting said photo-lacquer coated substrate to galvanic deposition so that said photo-lacquer functions as a galvanic mask.

* * * * *